(12) United States Patent
Itakura

(10) Patent No.: US 7,751,168 B2
(45) Date of Patent: Jul. 6, 2010

(54) POWER SUPPLY AND METHOD OF CONTROLLING SAME

(75) Inventor: Kazuhiko Itakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 175 days.

(21) Appl. No.: 12/222,304

(22) Filed: Aug. 6, 2008

(65) Prior Publication Data
US 2008/0301476 A1    Dec. 4, 2008

Related U.S. Application Data

(63) Continuation of application No. PCT/JP2006/303557, filed on Feb. 27, 2006.

(51) Int. Cl.
*H02H 9/08* (2006.01)
(52) U.S. Cl. .................................... 361/93.9
(58) Field of Classification Search ................. 361/93.9
See application file for complete search history.

(56) References Cited

U.S. PATENT DOCUMENTS

| | | | | | |
|---|---|---|---|---|---|
| 4,330,816 | A | * | 5/1982 | Imazeki et al. ........... | 363/21.05 |
| 5,227,964 | A | * | 7/1993 | Furuhata ................... | 363/56.1 |
| 5,297,014 | A | * | 3/1994 | Saito et al. ............... | 363/21.17 |
| 7,161,783 | B2 | * | 1/2007 | Yoshida .................... | 361/93.7 |
| 7,265,999 | B2 | * | 9/2007 | Murata et al. ............ | 363/16 |
| 2003/0128485 | A1 | | 7/2003 | Matsumoto | |

FOREIGN PATENT DOCUMENTS

| | | |
|---|---|---|
| JP | 60-114584 | 8/1985 |
| JP | 64-023724 | 1/1989 |
| JP | 2003-169471 | 6/2003 |

OTHER PUBLICATIONS

International Search Report of PCT Application No. PCT/JP/2006/303557 (mailed Apr. 25, 2006).

* cited by examiner

*Primary Examiner*—Ronald W Leja
(74) *Attorney, Agent, or Firm*—Staas & Halsey LLP

(57) ABSTRACT

A power supply supplying electric power through parallel operation of power supply units is disclosed. Each of the power supply units includes a transformer; a stopped state latch part configured to latch a control signal for controlling outputting of the power supply unit in a predetermined stopped state to stop the outputting, after passage of a first time in response to detection of an overcurrent on a primary side of the transformer; and an outputting restriction part configured to set the control signal in a predetermined restricted state to restrict the outputting of the power supply unit without stopping the outputting, after passage of a second time in response to detection of an overcurrent on a secondary side of the transformer. The second time is shorter than the first time.

12 Claims, 8 Drawing Sheets

POWER SUPPLY AND METHOD OF CONTROLLING SAME

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2006/303557, filed on Feb. 27, 2006, the entire contents of which are hereby incorporated by reference.

BACKGROUND OF THE INVENTION

1. Field of the Invention

The present invention relates to power supplies and methods of controlling the same, and more particularly to a power supply that supplies electric power to a load by parallel operation of multiple power supply units and to a method of controlling the same.

2. Description of the Related Art

In recent years, it has been common for power supplies having a DC-DC converter (hereinafter simply abbreviated as "DDC") applied thereto to have multiple small on-board DDCs on each printed circuit board because of the necessity of distributed power supply. The output current of each of these on-board DDCs is 40 to 70 A, and electric power is supplied to a high-end UNIX (registered trademark) server, the CPU/LSI of a mainframe, etc., by parallel redundant operation of two through eight on-board DDCs.

In such power supplies, it is a common practice to connect multiple power supply units (Power Supply 1, Power Supply 2, . . . ) in parallel, that is, to connect the output parts (Output Part 1, Output Part 2, . . . ) of the power supplies in parallel, as shown in FIG. 1, in order to output a large current.

Recent loads are of low voltage and large current. Therefore, it is often the case that a so-called "simple output connecting method" optimum for large current is applied to the output part of each of the power supply units connected in parallel as described above in place of a so-called "diode OR-ing method."

In the case of the "simple output connecting method," it is impossible to operate a power supply in a redundant manner. Unlike the "diode OR-ing method," however, it is possible to eliminate loss at a parallel connection point. Accordingly, it is a method optimal for a power supply system for large current.

On the other hand, this simple output connecting method cannot prevent a backflow of current in the case of a short-circuit failure (point X in the drawing) inside one of the power supply units as shown in FIG. 2. This makes it impossible to operate a power supply in a redundant manner. That is, in such a case, a current exceeding the supply capacity of a normal power supply unit flows from the normal power supply unit to the failed power supply unit. As a result, an overcurrent protection circuit operates inside the normal power supply unit, so that eventually, the normal power supply unit also stops its outputting.

That is, according to the "simple output connecting method," with the stoppage of a failed power supply unit, other normal power supply units in parallel operation also stop outputting. This causes the problem of the inability to distinguish the actually failed power supply unit.

In the case of the above-described "diode OR-ing method," for example, diodes D1 and D2 are provided in the output parts (Output Part 1, Output Part 2 . . . ) of power supply units as shown in FIG. 3. Therefore, if there is a short-circuit failure inside one of the power supply units, a backflow of current can be prevented by the diode D1 or D2. As a result, a normal power supply unit can continue to supply output voltage to a load without stopping outputting. Further, it is also possible to distinguish a failed power supply unit according to this method.

According to this "diode OR-ing method," however, because of the forward voltage VF of the OR-ing diode D1 or D2, a loss $P=Io1 \times VF$ at the time of large current output increases. This may result in an increase in the volume or price of the power supply unit because of the need for a heat sink for cooling. Accordingly, this is not necessarily an appropriate method if there is no need for redundant operation.

[Patent Document 1] Japanese Laid-Open Patent Application No. 2003-169471

SUMMARY OF THE INVENTION

Embodiments of the present invention may solve or reduce one or more of the above-described problems.

According to one embodiment of the present invention, there are provided a power supply in which one or more of the above-described problems may be solved or reduced and a method of controlling the power supply.

According to one embodiment of the present invention, there are provided a power supply and a method of controlling the same, the power supply making it possible to prevent a normal power supply unit operating in parallel from stopping its operation and to suitably distinguish a failed power supply unit when there is a failure in a power supply unit, while adopting the "simple output connecting method" in place of the "diode OR-ing method."

According to one embodiment of the present invention, there is provided a power supply supplying electric power through parallel operation of power supply units, wherein each of the power supply units includes a transformer; a stopped state latch part configured to latch a control signal for controlling outputting of the power supply unit in a predetermined stopped state to stop the outputting, after passage of a first time in response to detection of an overcurrent on a primary side of the transformer; and an outputting restriction part configured to set the control signal in a predetermined restricted state to restrict the outputting of the power supply unit without stopping the outputting, after passage of a second time in response to detection of an overcurrent on a secondary side of the transformer, wherein the second time is shorter than the first time.

According to one embodiment of the present invention, there is provided a method of controlling a power supply supplying electric power through parallel operation of power supply units, wherein each of the power supply units includes a transformer, the method including a stopped state latch step of latching a control signal for controlling outputting of the power supply unit in a predetermined stopped state to stop the outputting, after passage of a first time in response to detection of an overcurrent on a primary side of the transformer; and an outputting restriction step of setting the control signal in a predetermined restricted state to restrict the outputting of the power supply unit without stopping the outputting, after passage of a second time in response to detection of an overcurrent on a secondary side of the transformer, wherein the second time is shorter than the first time.

Thus, according to one aspect of the present invention, the distinguishing of a failed power supply unit is ensured. Therefore, in the case of occurrence of a failure, there is no need to replace all parallel-connected power supply units, and it is possible to respond by replacing only the distinguished failed power supply unit.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

According to one aspect of the present invention, in order to achieve the above-described object, a control signal for controlling the outputting of a power supply unit is latched in a predetermined stopped state to stop the outputting after passage of a first time in response to detection of an overcurrent on the primary side of a transformer, and the control signal is set in a predetermined restricted state to restrict the outputting of the power supply unit without stopping the outputting after passage of a second time in response to detection of an overcurrent on the secondary side of the transformer. Further, the second time is shorter than the first time.

Figure 1:
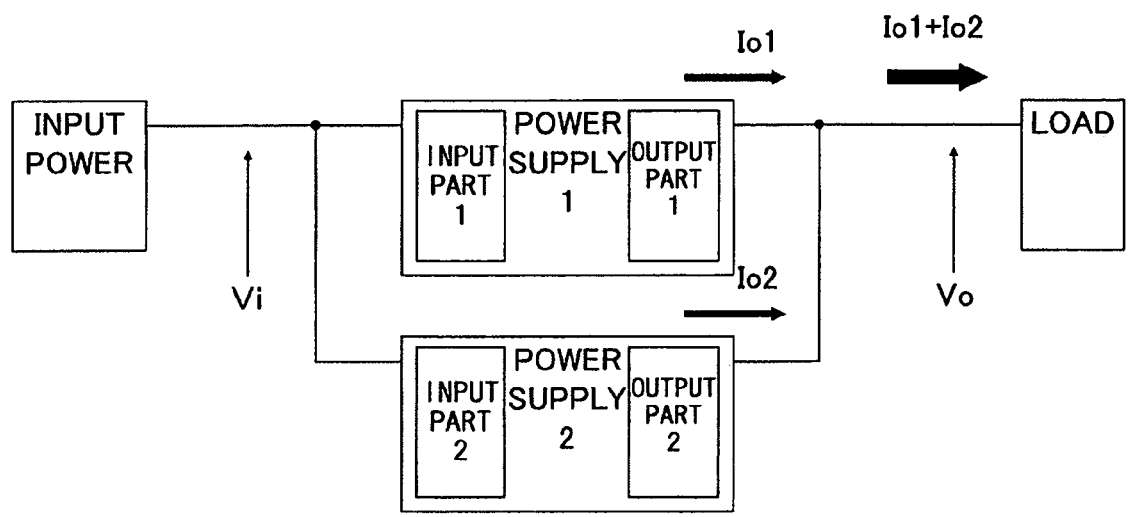
FIG. 1 is a diagram for illustrating a configuration of a power supply having multiple power supply units connected in parallel.
Figure 2:
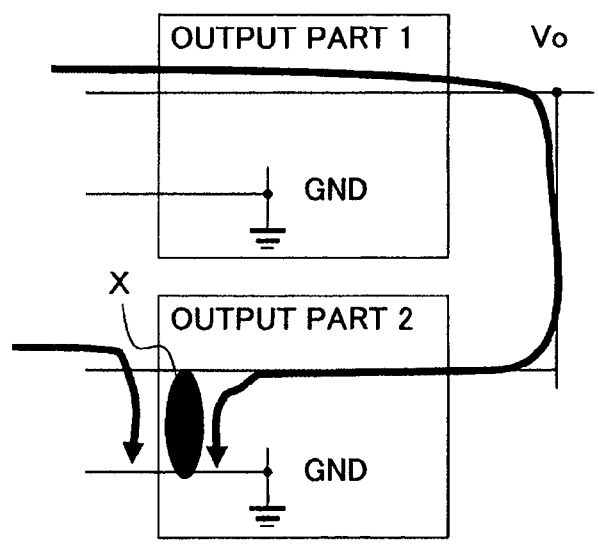
FIG. 2 is a diagram for illustrating the state of the power supply of FIG. 1 where a failure has occurred in one of the power supply units.
Figure 3:
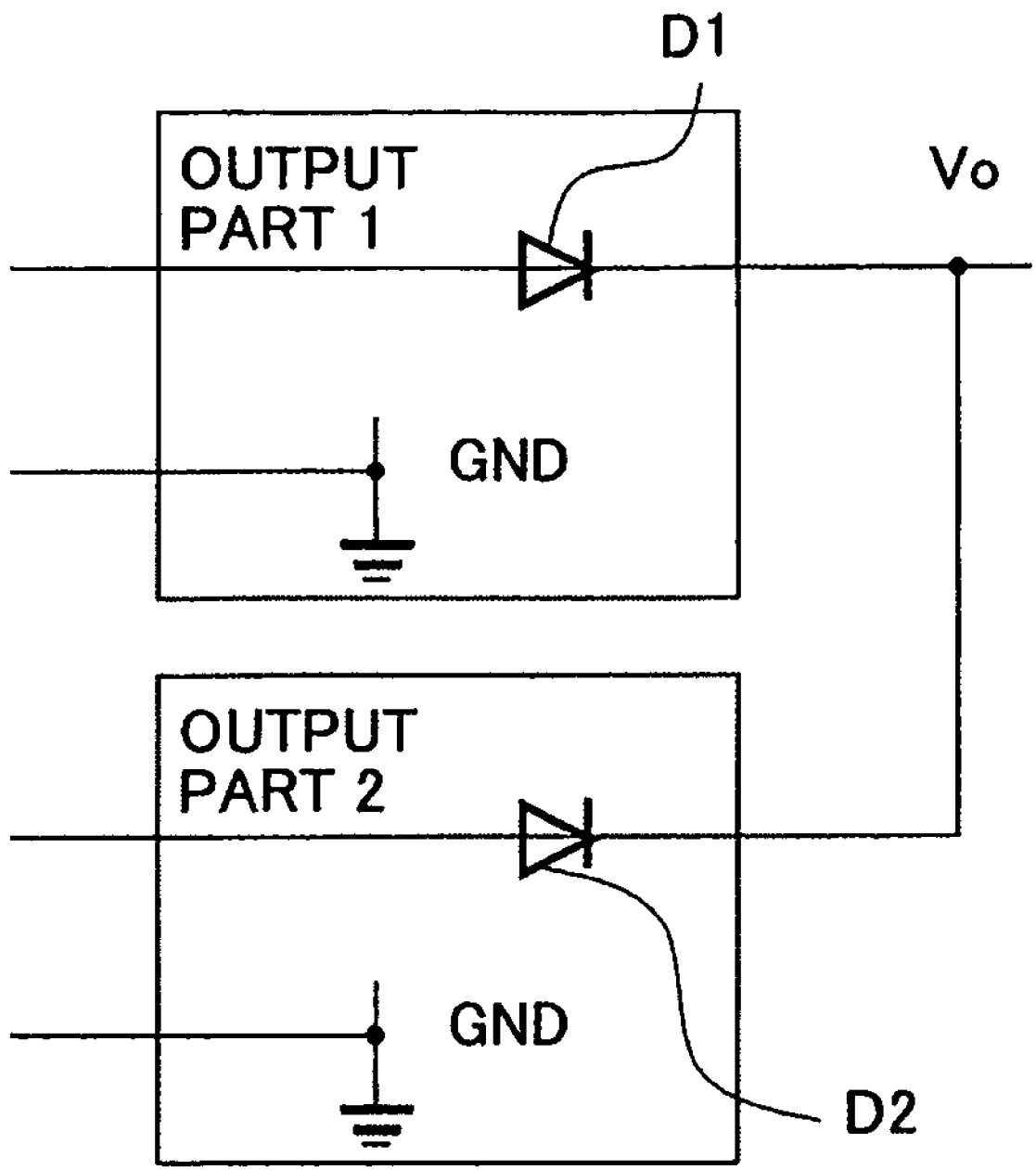
FIG. 3 is a diagram for illustrating a "diode OR-ing method"

As described above, in the case of a failure of one of the multiple power supply units in parallel operation, an excessive current flows from a normal power supply unit into the failed power supply unit as shown in FIG. 2. According to the present invention, the second time in setting the control signal in the restricted state in response to detection of an overcurrent on the secondary side of the transformer is shorter than the first time in setting a control current to the stopped state in response to detection of an overcurrent on the primary side of the transformer as described above. As a result, in such a case, each power supply unit shown in FIG. 2 performs the following operation.

That is, in the output part 1 of the normal power supply unit, an overcurrent flows out to the output part 2 of the parallel-connected failed power supply unit. Therefore, this is detected, and the control signal of the normal power supply unit is set in the restricted state after passage of the second time. On the other hand, this overcurrent is also detected on the primary side of the transformer of the normal power supply unit. However, the control signal is not set in the stopped state before passage of the first time, which is longer than the second time, on the primary side. Accordingly, the control signal is set in the restricted state based on the result of the detection on the secondary side before the control signal is set in the stopped state on the primary side. As a result, the normal power supply unit has its outputting restricted. Therefore, the output to be supplied to the failed power supply unit is restricted. Accordingly, the overcurrent state on the primary side disappears. Since this operation is performed before passage of the first time, the control signal is prevented from entering the stopped state in the normal power supply unit.

On the other hand, in the failed power supply unit including the output part 2 having the short-circuit part X, an overcurrent flows into the short-circuit part from the normal power supply unit. However, since the current is in the reverse direction, no overcurrent is detected on the primary side in the failed power supply unit. However, this overcurrent inflow causes the transformer of the failed power supply unit to be saturated. As a result, there is a substantial short circuit on the primary side in the failed power supply unit, so that an overcurrent is also generated on the primary side. This is detected, so that the control signal of the failed power supply unit is set in the stopped state after passage of the first time.

Thus, the control signal is set in the restricted state in the normal power supply unit, and the control signal is set in the stopped state in the failed power supply unit. As a result, the normal power supply unit continues its operation with a restricted output of electric power, while the operation of the failed power supply unit is completely stopped. Accordingly, it is possible to ensure the distinguishing of the failed power supply unit.

Further, preferably, when the control signal enters the stopped state, this is detected and a failure signal is generated. As a result, in the above-described case, the failure signal is generated from only the failed power supply unit, which further ensures the distinguishing of the failed power supply unit.

According to a mode of implementation of the present invention, each of the power supply units connected in parallel with one another to form a power supply has a fast "primary-side overcurrent protection circuit (with a latch)" and "secondary-side overcurrent protection circuit" that satisfy the following temporal relationship:

"secondary-side overcurrent response time ($\Delta t2$)"<"primary-side overcurrent response time ($\Delta t1$)"<"failure signal response time ($\Delta t3$)."

Further, a "failure signal" is transmitted upon detection of stoppage of control pulses that control the outputting of a power supply unit, thereby making it possible to ensure and facilitate identification of a failed power supply unit.

It is assumed that in one of the power supply units connected in parallel according to the above-described "simple output connecting method," a failure due to a short circuit between a power supply line and a ground line (hereinafter, simply referred to as "short-circuit failure") occurs on the secondary side of its transformer. In this case, all the parallel-connected power supply units including normal power supply units 10 stop as described above according to the conventional configuration.

In the power supply unit related to the failure (hereinafter, simply referred to as "failed power supply unit"), excessive currents are supplied to the short-circuit part (X in FIG. 2) from the other parallel-connected normal power supply units (hereinafter, simply referred to as "normal power supply units) as shown in FIG. 2. As a result, the transformer of the failed power supply unit is magnetically saturated, so that a substantial short circuit also occurs on the primary side of the transformer of the failed power supply unit through the transformer. As a result, the primary-side overcurrent protection functions, so that the power supply unit stops.

As described above, an excessive output current is supplied from each normal power supply unit to the short-circuit part (X in FIG. 2) in the failed power supply unit. As a result, in each normal power supply unit also, its transformer is magnetically saturated, so that a substantial short circuit also occurs on the primary side of the transformer of the normal power supply unit through the transformer. As a result, the primary-side overcurrent protection functions, so that the power supply unit also stops.

Thus, all the parallel-connected power supply units forming the power supply stop. In this case, all the units stop in an extremely short period of time after occurrence of the short-circuit failure. Further, in this case, since a failure signal is generated from every one of the power supply units that have stopped, the facility manager cannot identify the failed power supply unit. Accordingly, it is necessary to replace all the units or to identify the failed power supply unit by repeatedly replacing only some of the power supply units and re-turning on the remaining power supply units.

Replacement of all the units is too costly, while the method of identifying the failed power supply unit by repeated re-turning on as described above is not preferable for the power supply and its peripheral equipment because of repeated generation of overcurrent.

According to the mode of implementation of the present invention, a "drive signal circuit" that controls the pulse width of control pulses that control outputting is "latched" in a stopped state in response to detection of an overcurrent on the primary side by the "primary-side overcurrent protection circuit" in each power supply unit.

On the other hand, the "secondary-side overcurrent protection circuit (fast)" has its response time determined so that the "secondary-side overcurrent protection circuit (fast)" performs a protecting operation earlier than the above-described "primary-side overcurrent protection circuit" in response to detection of an overcurrent on the secondary side of the transformer. When the "secondary-side overcurrent protection circuit (fast)" operates, the "drive signal circuit" enters a predetermined "restricted state." In this restricted state, the pulse width of control pulses is reduced or the control pulses are intermittently generated. That is, the outputting of the power supply unit is restricted, but the operation of the "drive signal circuit" is not stopped.

Further, the function of monitoring the operation of the "drive signal circuit," and recognizing a failure and outputting a "failure signal" in response to the stoppage of control pulses is provided.

Thus, in each power supply unit, the delay time ($\Delta t2$) in the overcurrent on the secondary side causing the drive signal circuit to enter the restricted state is shorter than the delay time ($\Delta t1$) in the overcurrent on the primary side latching the "drive signal circuit" to the stopped state.

Further, as described above with reference to FIG. 2, when there is a short-circuit failure on the secondary side, an overcurrent on the secondary side is not detected in the failed power supply unit because the overcurrent is in the reverse direction. (See FIG. 2.) At this point, as described above, an overcurrent is caused on the primary side because of the magnetic saturation of the transformer, so that the drive signal circuit of the failed power supply unit is stopped after the predetermined delay time $\Delta t1$. As a result, the failure signal is generated from the failed power supply unit.

On the other hand, in a normal power supply unit, an overcurrent is detected on each of the primary side and the secondary side. (See FIG. 2). However, since $\Delta t1 > \Delta t2$ as described above, first, the drive signal circuit is caused to enter the "restricted state" by the overcurrent detection on the secondary side. As a result, the outputting of the power supply unit is restricted, so that the overcurrent state on the primary side disappears. Consequently, the overcurrent detection on the primary side does not cause a transition of the drive signal circuit to the stopped state. Accordingly, no failure signal is generated from the normal power supply unit.

Thus, according to the mode of implementation of the present invention, the failure signal is generated from only a failed power supply unit. Therefore, identification of the failed power supply unit is ensured and facilitated.

Thus, according to the mode of implementation of the present invention, in the case of a short-circuit failure of the switching element (such as a transistor or MOS-FET) of an inverter circuit on the primary side, the "primary-side overcurrent protection circuit" detects it and stops the control pulses of the drive signal circuit with the function of the protection circuit. As a result, a failure signal is output from the failed power supply unit, which can facilitate external recognition of the failed power supply unit.

Further, an overcurrent is generated on the primary side using the "magnetic saturation of a transformer" even in the case of a short-circuit failure of a rectifying element (such as a diode, transistor, or MOS-FET) of a rectifier circuit on the secondary side. As a result, the "primary-side overcurrent protection circuit" detects this and outputs a failure signal the same as described above.

That is, as described above, if there is a short-circuit failure inside a power supply unit, the overcurrent generated by the short circuit flows backward from the secondary side into the inside of the power supply unit. At this point, this cannot be detected by the "secondary-side overcurrent protection circuit," whose object is to detect an overcurrent in the forward direction, but the failure is detected by the "primary-side overcurrent protection circuit" because of the magnetic saturation of a transformer as described above. Accordingly, it is possible to detect a short-circuit failure inside the power supply unit itself.

Further, according to the mode of implementation of the present invention, the drive signal circuit is "latched" in a stopped state at the time of detection of a short-circuit failure on the primary side as described above. That is, an FET inserted in a primary-side power supply line is controlled to be latched in an OFF state after the above-described delay $\Delta t1$ in response to detection of an overcurrent by the primary-side overcurrent detection circuit. As a result, the primary side is shut off. Consequently, the failed state is prevented from spreading to other power supply units connected in parallel. This is because the supply of electric power on the primary side is interrupted by the shutting off of the primary side to stop control pulses.

On the other hand, the failure on the primary side in this failed power supply unit does not affect a normal power supply unit connected in parallel. Therefore, outputting is not stopped in the normal power supply unit. Accordingly, in this case, no failure signal is output from the normal power supply unit. As a result, it is externally recognized as a normal power supply unit, which enables the failed power supply unit to be distinguished.

That is, according to the mode of implementation of the present invention, the operation of the "drive signal circuit" of each power supply unit is monitored, and a failure is recognized and a "failure signal" is output in response to the stoppage of control pulses. Thus, the power supply unit outputs the failure signal in response to its internal short-circuit failure, thereby ensuring its external recognition as a failed power supply unit.

Further, according to the mode of implementation of the present invention, in response to detection of a sudden overcurrent flowing from a normal power supply unit to a failed power supply unit having a short-circuit failure, the function of the "secondary-side overcurrent protection circuit (fast)" causes the drive signal circuit to enter the restricted state after the above-described delay $\Delta t2$. That is, by reducing the pulse width of control pulses or making them intermittent, the control pulses are kept unstopped while restricting the overcurrent trying to flow to the failed power supply unit. That is, the drive signal circuit is prevented from being latched in the stopped state.

As a result, no failure signal is output from the normal power supply unit because the control pulses are not completely stopped. Consequently, it is externally recognized as a normal power supply. This is due to the fact that the overcurrent generated on the primary side in the normal power supply unit is reduced by restricting the overcurrent flowing out to the failed power supply unit with the function of the "secondary-side overcurrent protection circuit (fast)," thereby controlling the operation of the "primary-side overcurrent protection circuit."

As described above, this "secondary-side overcurrent protection circuit (fast)" has its response time $\Delta t2$ determined to be shorter than the response time $\Delta t1$ of the "primary-side overcurrent protection circuit," so as to have a high response speed. Accordingly, the operation of the "primary-side overcurrent protection circuit" of the normal power supply unit is prevented from being controlled and stopped as described above, so that it is not recognized as a failure.

That is, according to the mode of implementation of the present invention, it is possible to identify a failure immediately after occurrence of the failure. As a result, there is no need to re-turn on power to identify a failed power supply unit, and it is possible to facilitate and ensure identification of the failed power supply unit.

Further, according to the mode of implementation of the present invention, the secondary-side overcurrent protection function works in a normal power supply unit to reduce its secondary-side overcurrent and the primary-side overcurrent protection function operates in a failed power supply unit to stop its outputting because of fast overcurrent protection circuits that satisfy the condition of "the primary-side overcurrent response time $\Delta t1>$ the secondary-side overcurrent response time $\Delta t2$" during a normal continuous operation of a power supply.

Accordingly, there is no need for re-turning on, and it is possible to ensure and facilitate the distinguishing of the failed power supply unit. This makes it possible to respond by replacing only the failed power supply unit at a location where the power supply is installed.

A description is given below, with reference to the drawings, of embodiments of the present invention.

First Embodiment

Figure 4:
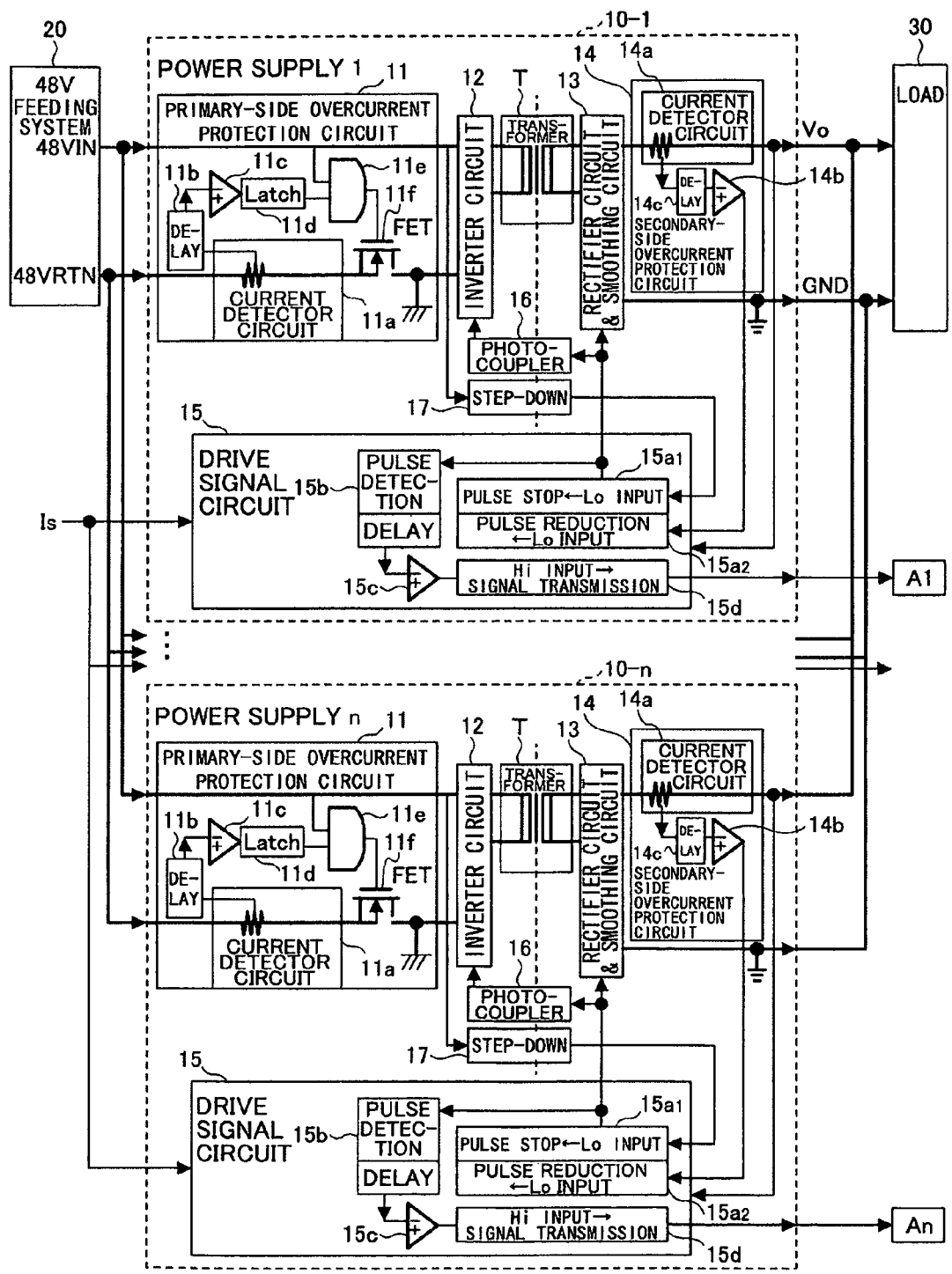
FIG. 4 is a diagram for illustrating a configuration of a power supply according to an embodiment of the present invention.

FIG. 4 is a circuit diagram of a power supply according to an embodiment of the present invention.

This power supply receives a supply of electric power of DC 48 V from a 48 V feeding system 20, converts it into a desired direct-current voltage in each of multiple power supply units 10-1 through 10-n (DDCs) connected in parallel, and thereafter outputs it to a load 30.

Each of the power supply units 10-1 through 10-n (hereinafter referred to as "each power supply unit 10") includes an inverter circuit 12, a transformer T, and a rectifier circuit and smoothing circuit 13.

Figure 9:
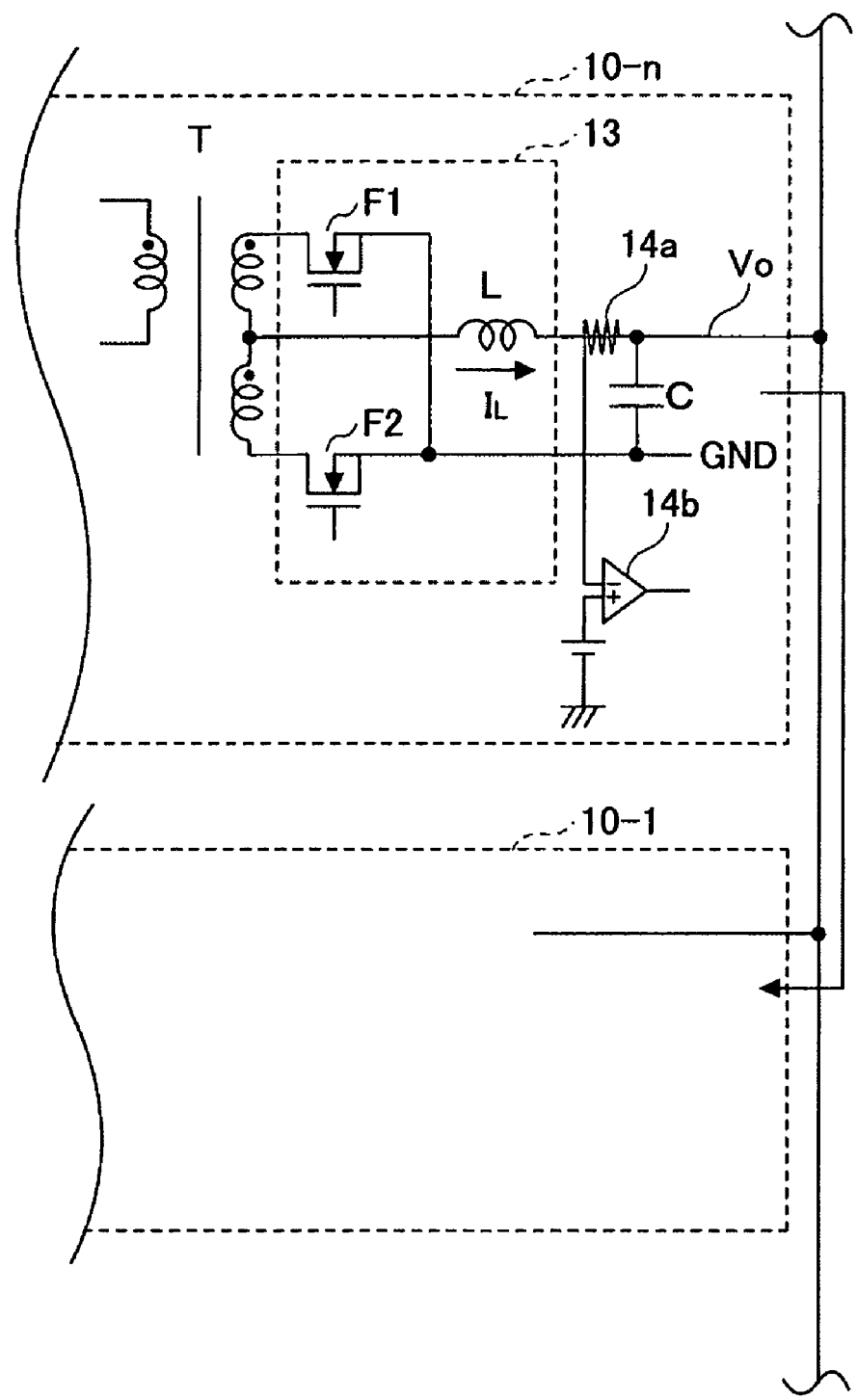
FIG. 9 is a circuit diagram of a rectifier circuit and smoothing circuit in the power supply of FIG. 4 according to the embodiment of the present invention.

The inverter circuit 12 receives a supply of DC 48 V direct-current power from the 48 V feeding system 20, and converts it into alternating-current power. The rectifier circuit and smoothing circuit 13, which has a circuit configuration as shown in FIG. 9, rectifies the alternating-current power supplied from the inverter circuit 12 through the transformer T with FETs F1 and F2, and smoothes it with a smoothing coil L and a smoothing capacitor C. At the time of thus converting the alternating-current power into direct-current power, an output voltage Vo is regulated by controlling the firing angles of the FETs F1 and F2 based on a known principle of PWM control.

The inverter circuit 12 and the rectifier circuit and smoothing circuit 13 are connected by a photocoupler 16. This is to exchange signals for synchronization of pulse control between the inverter circuit 12 and the rectifier circuit and smoothing circuit 13.

Each power supply unit 10 further includes a drive signal circuit 15.

The drive signal circuit 15 provides the rectifier circuit and smoothing circuit 13 with control pulses in response to reception of an external start signal Is. That is, the drive signal circuit 15 controls the direct-current power voltage supplied from the rectifier circuit and smoothing circuit 13 to the load 30 by controlling the firing angles of the FETs F1 and F2 of the rectifier circuit and smoothing circuit 13 by increasing or decreasing the pulse width of control pulses. In the drawing, a graphical illustration of a circuit configuration related to generation of the control pulses is omitted. For example, a known configuration in a DDC configured to control outputting based on PWM control is directly applicable to the circuit configuration related to generation of the control pulses, and a description thereof is omitted here.

Further, the drive signal circuit 15 includes a control pulse stopping part 15a1, a control pulse restriction part 15a2, a control pulse detection part 15b, a comparator 15c, and a failure signal generation part 15d.

The control pulse stopping part 15a1 detects stoppage of a supply of direct-current power to the inverter circuit 12 through a step-down circuit 17, and stops supplying control pulses to the rectifier circuit and smoothing circuit 13. As a result, the FETs F1 and F2 shown in FIG. 9 are turned OFF, so that a supply of electric power to the load 30 is stopped. The state of the drive signal circuit 15 at this point is referred to as "stopped state."

Further, the control pulse restriction part 15a2 reduces the pulse width of control pulses or generates intermittent control pulses in response to receiving a detection signal output from a secondary-side overcurrent protection circuit 14 upon its detection of an overcurrent. The state of the drive signal circuit 15 at this point is referred to as "restricted state." As a result, the output of the rectifier circuit and smoothing circuit 13 to the load 30 is restricted.

The control pulse detection part 15b monitors control pulses, and transmits a detection signal to the comparator 15c in response to continuation of the stoppage of control pulses for a predetermined time $\Delta t3$ (specifically, 20 msec). In response to reception of this, the comparator 15c compares it with a predetermined reference level, and transmits a detection signal if it exceeds this. In response to reception of this, the failure signal generation part 15d transmits a failure signal (A1 through An) outside. Electric power is constantly supplied externally to the control pulse detection part 15b, the comparator 15c, and the failure signal generation part 15d, thus enabling their operations even in the case of interruption of a supply of auxiliary electric power through the step-down circuit 17 due to a failure of the power supply unit 10.

Further, each power supply unit 10 includes a primary-side overcurrent protection circuit 11. The protection circuit 11 includes a current detector circuit 11a, a delay circuit 11b, a comparator 11c, a latch circuit 11d, an AND element 11e, and a FET 11f. In the protection circuit 11, in response to detection of a primary-side overcurrent by the current detector circuit 11a, a detection signal is output to the comparator 11b after a delay of a predetermined response time $\Delta t1$ (specifically, 4 μsec) in the delay circuit 11b. The comparator 11b compares the level of the detection signal with a predetermined reference level, and outputs a detection signal to the latch circuit 11d if the level of the detection signal exceeds this. The latch circuit 11d latches this detection signal, and outputs it to the AND element 11e. The AND element 11e performs AND logical operation on the detection signal and a supply voltage, and outputs to the FET 11f a signal to interrupt a supply of electric power. The FET 11f turns OFF in response to reception of this, so that a supply of power to the inverter circuit 12 is stopped.

Thus, the primary-side overcurrent protection circuit 11 performs an operation for stopping a supply of power to the inverter circuit 12 after the predetermined response time $\Delta t1$ at the time of detection of a primary-side overcurrent. Further, the interruption of power supply by the FET 11f continues to be maintained by the function of the latch circuit 11d even after disappearance of the above-described overcurrent state.

Each power supply unit 10 further includes the secondary-side overcurrent protection circuit 14. The protection circuit 14 includes a current detector circuit 14a, a delay circuit 14c, and a comparator 14b. In the protection circuit 14, in response to detection of a secondary-side overcurrent by the current detector circuit 14a, a detection signal is output to the comparator 14b after a delay of a predetermined response time $\Delta t2$ (specifically, 2 μsec) in the delay circuit 14c. In response to reception of this, the comparator 14b compares the level of the detection signal with a predetermined reference level, and outputs a detection signal to the control pulse restriction part 15a2 of the drive signal circuit 15 if the level of the detection signal exceeds this.

A description is given below, with reference to FIG. 5 through FIG. 9, of an operation in the case of occurrence of a short-circuit failure in the power supply unit 10-1 of the power supply having such a configuration.

Figure 7:
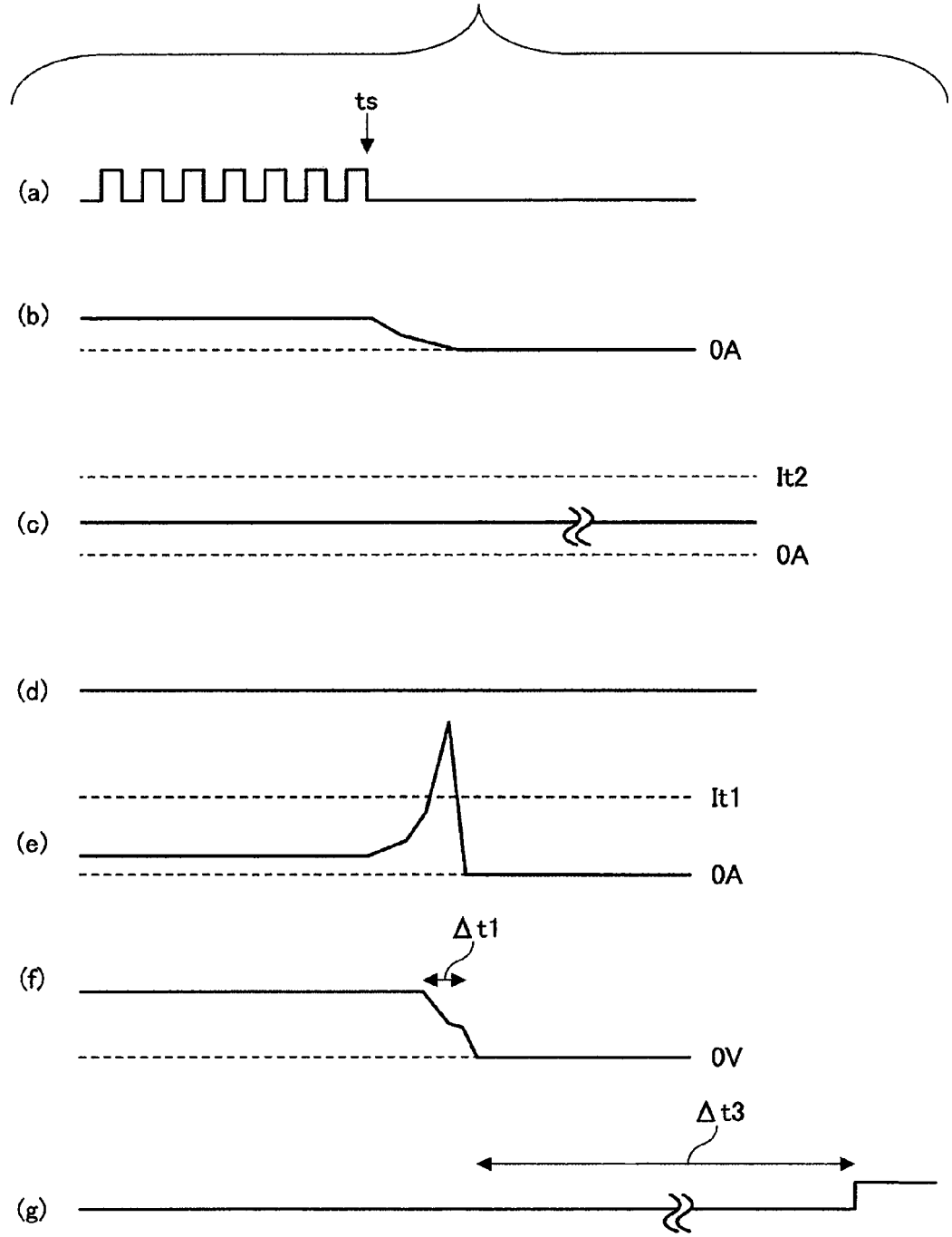
FIG. 7 is a (first) time chart for illustrating the operation of the power supply of FIG. 4 according to the embodiment of the present invention.

In FIG. 7, (a) shows the output waveform of an inverter FET in the inverter circuit 12 of the failed power supply unit 10-1, (b) shows the output voltage supplied from the rectifier circuit and smoothing circuit 13 of the failed power supply unit 10-1 to the load 30, (c) shows the output voltage supplied from the rectifier circuit and smoothing circuit 13 of the parallel-connected normal power supply unit 10-n other than the failed power supply unit 10-1 to the load 30, (d) shows the state of the failure signal An of the normal power supply unit 10-n, (e) shows a current flowing through the inverter circuit 12 of the failed power supply unit 10-1, (f) shows the gate voltage of the FET 11f in the primary-side overcurrent protection circuit 11 of the failed power supply unit 10-1, and (g) shows the state of the failure signal A1 of the failed power supply unit 10-1.

Figure 8:
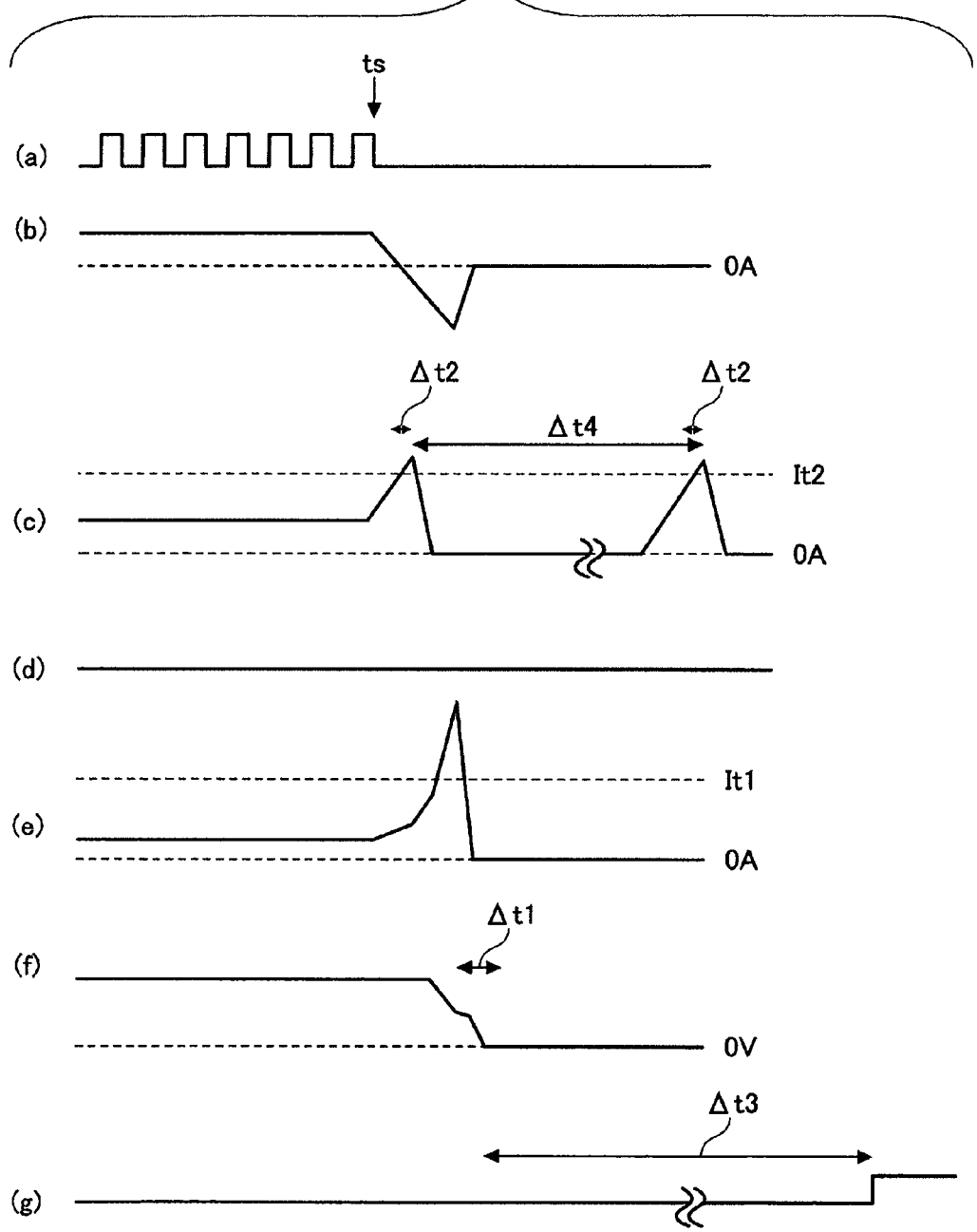
FIG. 8 is a (second) time chart for illustrating the operation of the power supply of FIG. 4 according to the embodiment of the present invention.

In FIG. 8, (a) shows the output waveform of the rectifying FETs (F1 and F2 in FIG. 9) in the rectifier circuit and smoothing circuit 13 of the failed power supply unit 10-1, (b) shows the output voltage supplied from the rectifier circuit and smoothing circuit 13 of the failed power supply unit 10-1 to the load 30, (c) shows the output voltage supplied from the rectifier circuit and smoothing circuit 13 of the parallel-connected normal power supply unit 10-n other than the failed power supply unit 10-1 to the load 30, (d) the state of the failure signal An of the normal power supply unit 10-n, (e) shows a current flowing through the inverter circuit 12 of the failed power supply unit 10-1, (f) shows the gate voltage of the FET 11f in the primary-side overcurrent protection circuit 11 of the failed power supply unit 10-1, and (g) shows the state of the failure signal A1 of the failed power supply unit 10-1.

Figure 5:
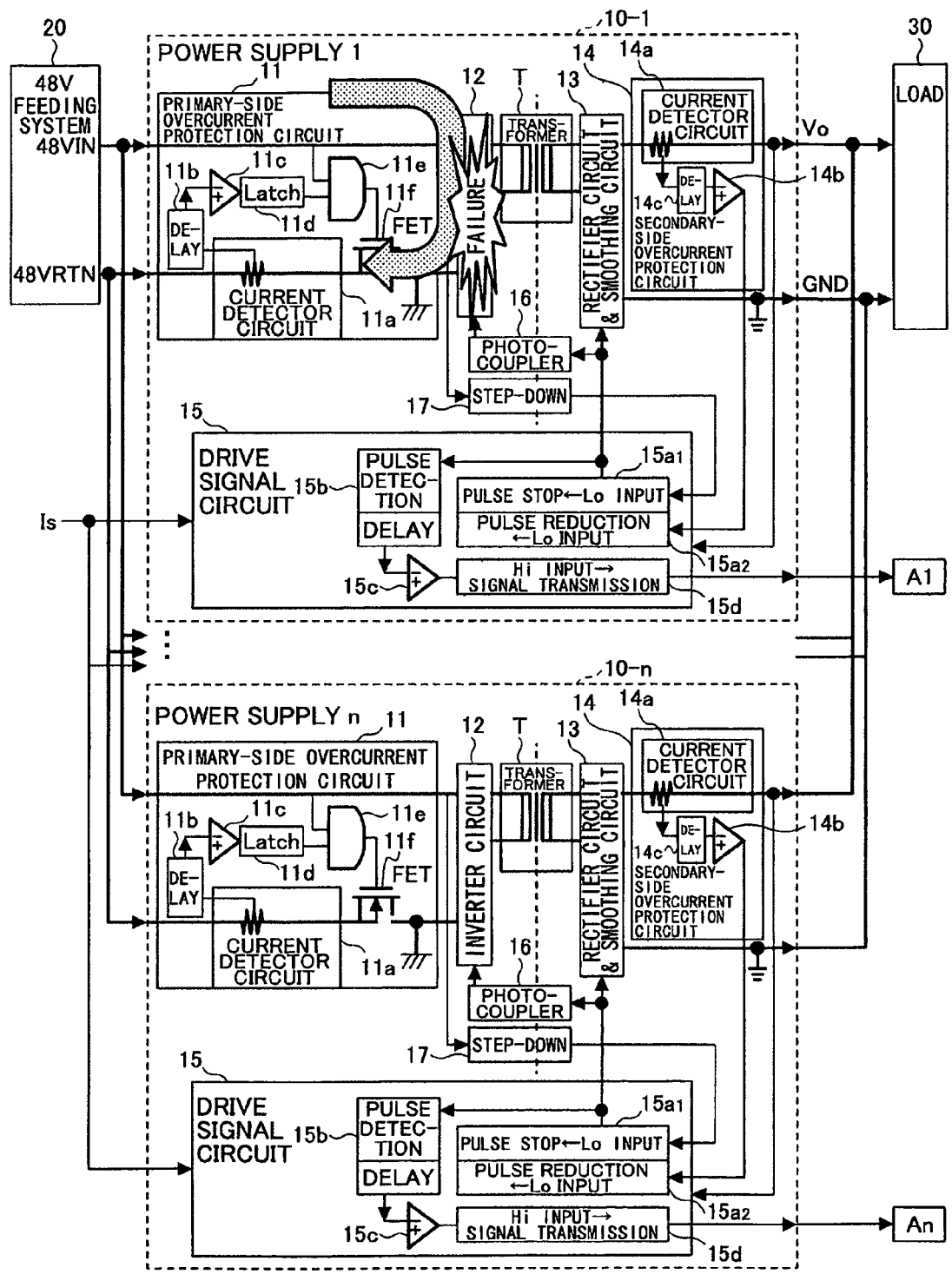
FIG. 5 is a (first) diagram for illustrating the operation of the power supply of FIG. 4 according to the embodiment of the present invention.

First, a description is given, with reference to FIG. 5 and FIG. 7, of an operation in the case of occurrence of a short-circuit failure on the primary side of the transformer T in the failed power supply unit 10-1.

Specifically, it is assumed that a power supply line and a ground line are short-circuited because of a failure of an element in the inverter circuit 12 at time ts. (See FIG. 7(a).)

In this case, as shown in FIG. 7(e), an overcurrent is caused on the primary side in the failed power supply unit 10-1. When the primary-side current exceeds a threshold It1 (FIG. 7(e)), the primary-side overcurrent protection circuit 11 operates after the response time $\Delta t1$ as shown in FIG. 7(f). As a result, the FET 11f of the protection circuit 11 turns OFF to stop a supply of electric power to the inverter circuit 12. Consequently, the failed power supply unit stops its outputting as shown in FIG. 7(b).

As a result, the overcurrent state disappears as shown in FIG. 7(e). However, the OFF state of the FET 11f is maintained by the function of the latch circuit 11d of the primary-side overcurrent protection circuit 11.

Further, the stoppage of the primary-side power supply caused by the turning OFF of the FET 11f is detected by the control pulse stopping part 15a1 of the drive signal circuit 15. As a result, a supply of control pulses from the drive signal circuit 15 to the rectifier circuit and smoothing circuit 13 is stopped after the response time $\Delta t1$ since the failure occurrence ts. Thereafter, after the predetermined time $\Delta t3$ (20 msec), a detection signal is transmitted from the control pulse detection part 15b to be communicated to the failure signal generation part 15d through the comparator 15c. In response to reception of this, the failure signal generation part 15d transmits the failure signal A1 outside (FIG. 7(g)).

In this case, the parallel-connected normal power supply unit 10-n is not affected, so that the failure signal An is not generated from its failure signal generation part 15d (FIG. 7(d)).

Thus, in the case of a short-circuit failure on the primary side in the failed power supply unit 10-1, the failure signal A1 is generated in the failed power supply unit 10-1 while the failure signal An is not generated in the normal power supply unit 10-n. Therefore, it is possible to ensure identification of the failed power supply unit.

Figure 6:
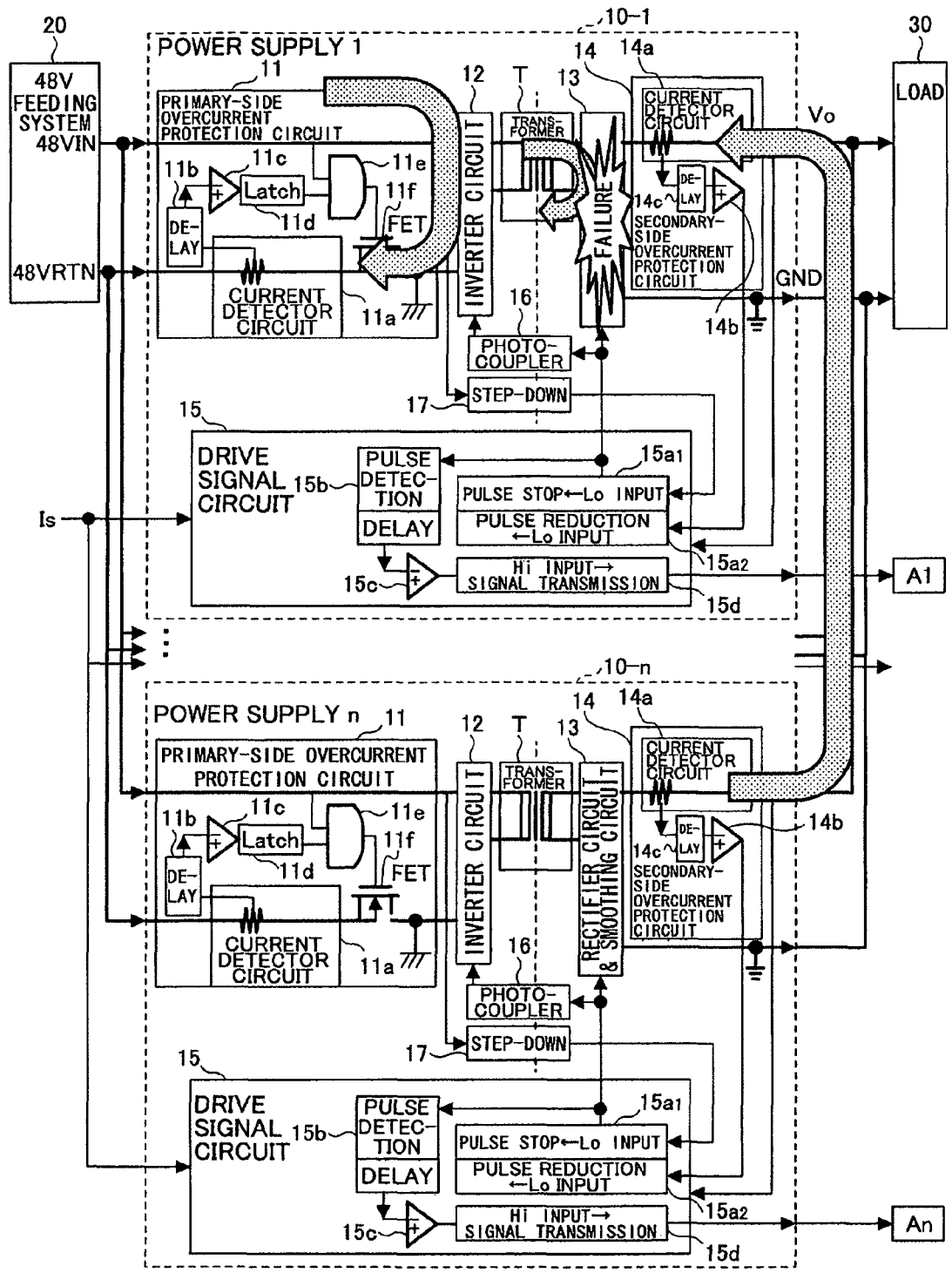
FIG. 6 is a (second) diagram for illustrating the operation of the power supply of FIG. 4 according to the embodiment of the present invention.

Next, a description is given, with reference to FIG. 6 and FIG. 8, of an operation in the case of occurrence of a short-circuit failure on the secondary side of the transformer T in the failed power supply unit 10-1.

Specifically, it is assumed that a power supply line and a ground line are short-circuited because of a failure of an element in the rectifier circuit and smoothing circuit 13 at time ts. (See FIG. 8(a).)

In this case, as shown in FIG. 8(b), a backflow phenomenon occurs in the rectifier circuit and smoothing circuit 13 on the secondary side in the failed power supply unit 10-1 because of a supply of electric power to the short-circuit failure part from the normal power supply unit 10-n, etc. In this case, since the overcurrent is in the reverse direction, the secondary-side overcurrent protection circuit 14 does not operate in the failed power supply unit 10-1. However, this overcurrent causes the transformer T of the failed power supply unit 10-1 to be magnetically saturated. As a result, a short-circuited state is also caused on the primary side through the transformer T, so that an overcurrent is generated on the primary side in the failed power supply unit 10-1 (FIG. 8(e)).

If this primary-side overcurrent state continues for more than the predetermined threshold It1 (FIG. 8(e)), the primary-side overcurrent protection circuit 11 operates after the response time Δt1 (4 μsec) as shown in FIG. 8(f). As a result, the FET 11f of the protection circuit 11 turns OFF to stop a supply of electric power to the inverter circuit 12. Consequently, the failed power supply unit 10-1 stops its outputting as shown in FIG. 8(b).

As a result, the primary-side overcurrent state also disappears as shown in FIG. 8(e). However, the OFF state of the FET 11f is maintained by the function of the latch circuit 11d of the primary-side overcurrent protection circuit 11 in the failed power supply unit 10-1, so that the stoppage of its outputting is maintained.

Further, the stoppage of the primary-side power supply caused by the turning OFF of the FET 11f is simultaneously detected by the control pulse stopping part 15a1 of the drive signal circuit 15 in the failed power supply unit 10-1. Accordingly, a supply of control pulses from the drive signal circuit 15 to the rectifier circuit and smoothing circuit 13 is stopped after the response time Δt1 (4 μsec) since the failure occurrence. Thereafter, after the predetermined time Δt3 (20 msec), a detection signal is transmitted from the control pulse detection part 15b to be communicated to the failure signal generation part 15d through the comparator 15c. In response to reception of this, the failure signal generation part 15d transmits the failure signal A1 outside (FIG. 8(g)).

On the other hand, as a result of the short-circuit failure on the secondary side in the failed power supply unit, the parallel-connected normal power supply unit 10-n performs the operation of supplying electric power to the failed part thereof. As a result, an overcurrent is generated in the rectifier circuit and smoothing circuit 13 of the normal power supply unit 10-n (FIG. 8(c)).

If this results in the output current exceeding a predetermined threshold It2 (FIG. 8(c)), this is detected by the secondary-side overcurrent protection circuit 14 of the normal power supply unit 10-n. As a result, a supply of control pulses from the drive signal circuit 15 to the rectifier circuit and smoothing circuit 13 is restricted by the function of the control pulse restriction part 15a2 after the response time Δt2 (2 μsec). Here, a case is shown where control pulses are intermittently generated at predetermined pulse stop intervals Δt4 (specifically, 10 msec).

Thus, in the normal power supply unit 10-n, a supply of control pulses to the rectifier circuit and smoothing circuit 13 is restricted, so that the secondary-side overcurrent is restricted. As a result, the magnetic saturation of the transformer T is suppressed. As shown in FIG. 9, the rate of increase of the current supplied from this normal power supply unit 10-n to the short-circuit failure part of the failed power supply unit 10-1 is restricted to Vo/L by the function of the smoothing coil L included in the rectifier circuit and smoothing circuit 13. Accordingly, an increase in the output current during the response time Δt2 (2 μsec) of the secondary-side overcurrent protection circuit 14 is suppressed in the normal power supply unit 10-n.

Accordingly, the secondary-side output is restricted before the magnetic saturation of the transformer T, so that the primary-side overcurrent protection circuit 11 is prevented from operating in the normal power supply unit 10-n. The failure signal An is not transmitted from the failure signal generation part 15d of the normal power supply unit 10-n. In particular, the response time Δt2 (2 μsec) of the secondary-side overcurrent protection circuit 14 is shorter than the response time Δt1 (4 μsec) of the primary-side overcurrent protection circuit 11, so that the secondary-side overcurrent protection circuit 14 operates earlier in the normal power supply unit 10-n. As a result, the drive signal circuit 15 reaches the "restricted state" before reaching the "stopped state." Consequently, the outputting of the normal power supply unit is restricted and its primary-side overcurrent is eliminated, so that the drive signal circuit 15 is prevented from entering a complete "stopped state."

Further, the stop period of intermittent generation of control pulses Δt4 (10 msec; FIG. 8(c)) in the "restricted state" is determined to be shorter than the delay time Δt3 (20 msec; FIG. 8(g)) related to transmission of the failure signal A by the failure signal generation part 15d. Therefore, the failure signal generation part 15d is prevented from operating during the stop period of the intermittent generation in the "restricted state," so that no failure signal is generated. Accordingly, the failure signal An is not generated in the normal power supply unit 10-n.

Thus, in the case of a secondary-side failure also, since the failure signal A1 is generated in the failed power supply unit 10-1 and the failure signal An is not generated in the normal power supply unit 10-n, it is possible to ensure identification of the failed power supply unit 10-1.

Thus, according to one aspect of the present invention, the distinguishing of a failed power supply unit is ensured. Therefore, in the case of occurrence of a failure, there is no need to replace all parallel-connected power supply units, and it is possible to respond by replacing only the distinguished failed power supply unit.

The present invention is not limited to the specifically disclosed embodiment, and variations and modifications may be made without departing from the scope of the present invention.

What is claimed is:

1. A power supply supplying electric power through parallel operation of power supply units, wherein each of the power supply units comprises:
   a transformer;
   a stopped state latch part configured to latch a control signal for controlling outputting of the power supply unit in a predetermined stopped state to stop the outputting, after passage of a first time in response to detection of an overcurrent on a primary side of the transformer; and
   an outputting restriction part configured to set the control signal in a predetermined restricted state to restrict the outputting of the power supply unit without stopping the outputting, after passage of a second time in response to detection of an overcurrent on a secondary side of the transformer,
   wherein the second time is shorter than the first time.

2. The power supply as claimed in claim 1, wherein each of the power supply units further comprises a failure signal output part configured to generate a failure signal in response to a control power supply being latched in the stopped state by the stopped state latch part.

3. The power supply as claimed in claim 1, wherein each of the power supply units is configured to have the transformer magnetically saturated in response to an inflow of the overcurrent from an output side due to a failure of a secondary-side circuit of the power supply unit, so that the overcurrent is generated on the primary side to cause the stopped state latch part to operate to latch the control signal in the stopped state.

4. The power supply as claimed in claim 1, wherein the outputting restriction part is configured to intermittently generate the control signal in the predetermined restricted state.

5. The power supply as claimed in claim 1, wherein each of the power supply units is configured to control the outputting by PWM control based on an increase or decrease in a pulse width of pulses forming the control signal, and
the outputting restriction part is configured to decrease the pulse width of the pulses forming the control signal in the predetermined restricted state.

6. The power supply as claimed in claim 1, wherein each of the power supply units further comprises a failure signal output part,
the outputting restriction part is configured to insert the stopped state between generations of the control signal for a predetermined stop time by intermittently generating the control signal in the predetermined restricted state, and
the failure signal output part is configured to generate a failure signal in response to a time for which the control signal is in the stopped state exceeding the predetermined stop time.

7. A method of controlling a power supply supplying electric power through parallel operation of power supply units, wherein each of the power supply units includes a transformer, the method comprising:
a stopped state latch step of latching a control signal for controlling outputting of the power supply unit in a predetermined stopped state to stop the outputting, after passage of a first time in response to detection of an overcurrent on a primary side of the transformer; and
an outputting restriction step of setting the control signal in a predetermined restricted state to restrict the outputting of the power supply unit without stopping the outputting, after passage of a second time in response to detection of an overcurrent on a secondary side of the transformer,
wherein the second time is shorter than the first time.

8. The method of controlling the power supply as claimed in claim 7, further comprising a failure signal generation step of generating a failure signal in response to a control power supply being latched in the stopped state by the stopped state latch step.

9. The method of controlling the power supply as claimed in claim 7, wherein each of the power supply units is configured to have the transformer magnetically saturated in response to an inflow of the overcurrent from an output side due to a failure of a secondary-side circuit of the power supply unit, so that the overcurrent is generated on the primary side to cause the stopped state latch step to operate to latch the control signal in the stopped state.

10. The method of controlling the power supply as claimed in claim 7, wherein the outputting restriction step intermittently generates the control signal in the predetermined restricted state.

11. The method of controlling the power supply as claimed in claim 7, wherein each of the power supply units is configured to control the outputting by PWM control based on an increase or decrease in a pulse width of pulses forming the control signal, and
the outputting restriction step decreases the pulse width of the pulses forming the control signal in the predetermined restricted state.

12. The method of controlling the power supply as claimed in claim 7, further comprising a failure signal output step,
wherein the outputting restriction step inserts the stopped state between generations of the control signal for a predetermined stop time by intermittently generating the control signal in the predetermined restricted state, and
the failure signal output step generates a failure signal in response to a time for which the control signal is in the stopped state exceeding the predetermined stop time.

* * * * *